Patented Sept. 16, 1924.

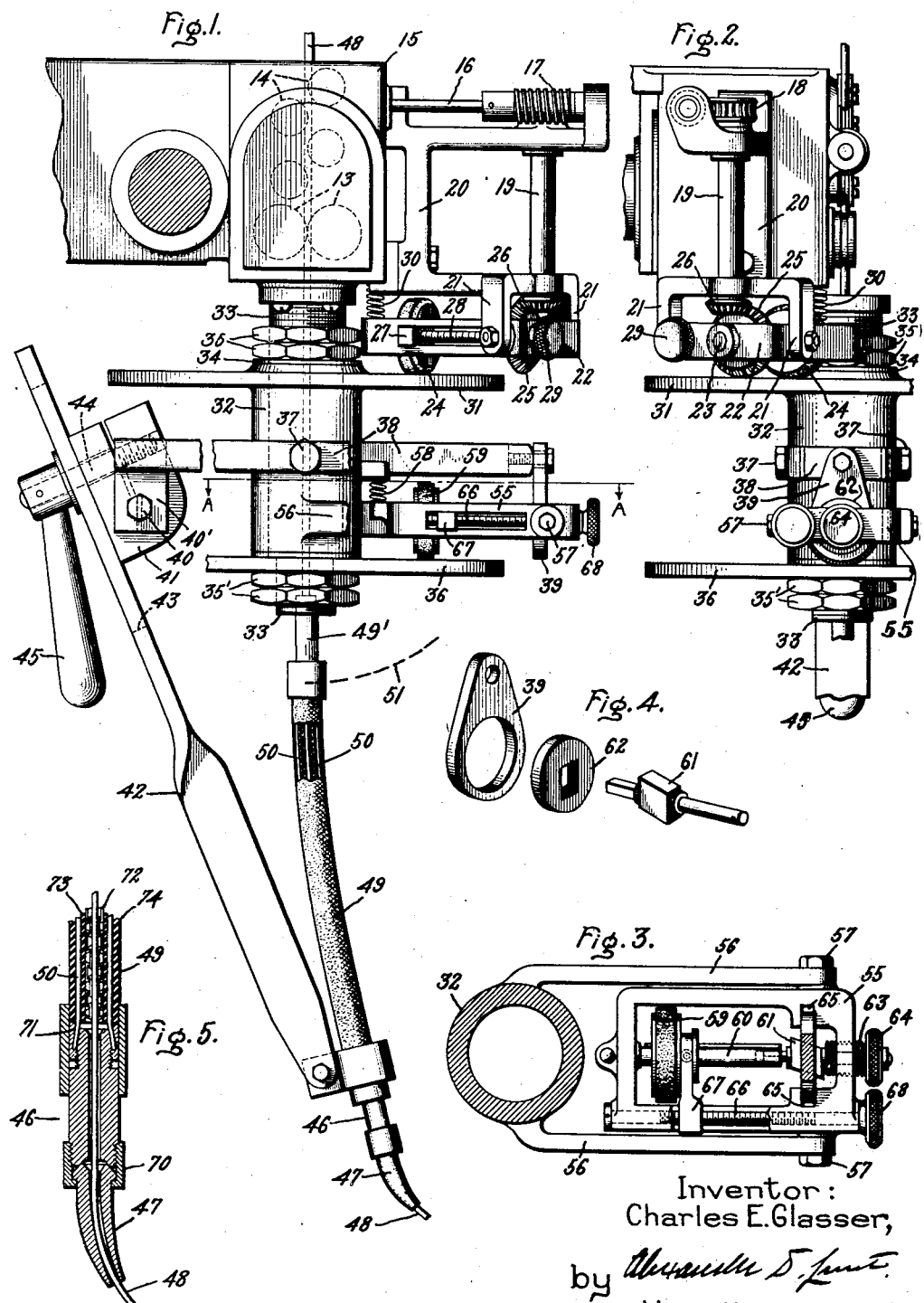

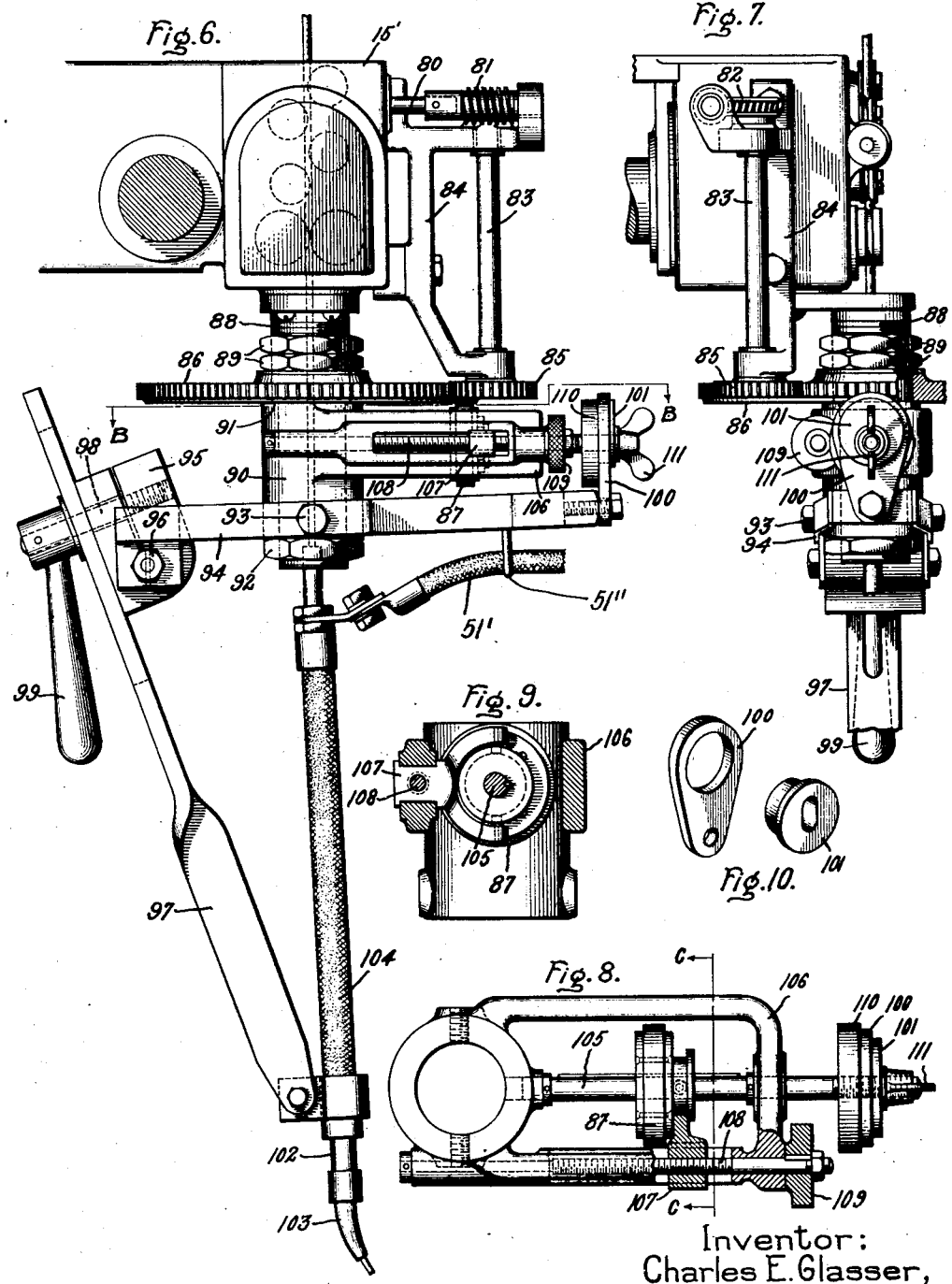

1,508,690

UNITED STATES PATENT OFFICE.

CHARLES E. GLASSER, OF SCHENECTADY, NEW YORK, ASSIGNOR TO GENERAL ELECTRIC COMPANY, A CORPORATION OF NEW YORK.

WELDING MACHINE.

Application filed November 11, 1922. Serial No. 600,201.

*To all whom it may concern:*

Be it known that I, CHARLES E. GLASSER, a citizen of the United States, residing at Schenectady, in the county of Schenectady, State of New York, have invented certain new and useful Improvements in Welding Machines, of which the following is a specification.

My present invention relates to improvements in welding machines, and particularly to automatic arc welding machines wherein means are provided to oscillate the welding electrode as it is automatically fed to the welding region.

An object of my invention is to provide an improved means for automatically oscillating the tip of the welding wire or electrode in an automatic welding machine during the travel along the seam or joint which is being welded, to thereby secure a more even distribution of the heat and the welding material and also a better and stronger joint.

A further object of my invention is to provide an automatic oscillating means of the class described which can be adjusted as to direction, amplitude and speed without discontinuing the welding operation.

Other objects of my invention are to provide an apparatus for delivering the welding electrode in electric arc welding machines of the class described, which can be readily moved to and from the work without disturbing the major parts of said machine, and to provide an apparatus which may be conveniently arranged for welding in corners and other places where it is difficult or impossible to accomplish automatic welding with arrangements of the prior art with which I am familiar.

In practicing the art of electric arc welding, it has been found desirable in many kinds of work to oscillate or move the electrode back and forth across the seam as it is being welded, to thereby secure a more even distribution of the heat generated by the arc. This is particularly desirable when the electrode is formed of a fusible welding material, since it gives, in addition to a distribution of heat, a more even distribution of the welding material.

My invention will be better understood from the following description taken in connection with the accompanying drawings, in which I have shown preferred embodiments thereof. I desire to have it understood, however, that various changes can be made in the details of construction and arrangement of the parts without departing from the spirit and scope of my invention as defined in the appended claims.

In the drawings, Figure 1 is a side elevation of one modification of my invention, some of the parts in this view being broken away to show more clearly the details of construction; Fig. 2 is a partial end view of the modification shown in Fig. 1; Fig. 3 is a view taken along line A—A of Fig. 1; Fig. 4 is an exploded view of the eccentric means shown in Fig. 3; Fig. 5 is a sectional view showing the electrode delivery device or nozzle; Fig. 6 is a side elevation of another modification of my invention; Fig. 7 is an end view of the modification shown in Fig. 6; Fig. 8 is a view partly in section taken along line B—B of Fig. 6; Fig. 9 is a sectional view taken along line C—C of Fig. 8; and Fig. 10 is an exploded view of another form of eccentric means.

Referring now with more particularity to Figs. 1 and 2 of the drawings, these drawings show a modification of my invention which is capable of imparting a transverse oscillatory movement or a circular oscillatory movement to the electrode when welding either along a straight line or in a circle or any traversing motion. In these figures, 15 indicates the head of a welding machine having an electrode feeding mechanism mounted therein or thereon for feeding the welding wire or electrode 48 to the work. In order to secure relative movement along the line of the weld, the head may be fixed and the work moved thereunder or the work may be fixed and the head moved over the work in any desired path. The electrode feeding mechanism may comprise feed rolls 13 for gripping the electrode and feeding it to the work. The electrode may be drawn from a reel not shown and will ordinarily be drawn through straightening rolls 14 located in or on the welding head. The feed rolls 13 may be driven in any suitable manner and will preferably be driven by means which varies in speed in response to the voltage of the arc so that the welding arc is maintained at constant length. A shaft 16 carrying a worm 17 is arranged to be driven in any suitable way, preferably with or from the feed rolls 13, by suitable gearing not shown in the drawing. The worm gear 17 meshes with a worm wheel 18 mounted upon the upper end of a shaft 19 which is journaled in a bracket 20 attached to the head 15. The bracket 20 also supports the outer end of the shaft 16. Projecting from the bracket 20 are two arms 21 which support the pivot end of a frame 22 in which is journaled a shaft 23. Keyed to the shaft 23 is a slidable friction roller 24 and a bevel gear 25. The gear 25 meshes with a similar bevel gear 26 mounted upon and keyed to the lower end of shaft 19. A forked member 27 screw-threaded to a shaft 28 engages the friction roller 24 and secures it in any desired location along the shaft 23. A thumb knob 29 is provided at the end of screw shaft 28 to facilitate adjustment of the friction roller 24.

The frame 22 carrying friction roller 24 is biased in a downward direction by means of a spring 30 so that the friction roller 24 engages a horizontally disposed flange 31 of a rotatable member 32. The rotatable member 32 is mounted free to rotate upon a hollow shaft 33 supported by and projecting from the bottom side of the head 15 and it is located upon the hollow shaft 33 by means of washers 34 and lock nuts 35. Also mounted upon a reduced portion of the hollow shaft 33 and below the hub member 32 is a disc member 36. The disc member 36 engages the shoulder formed by the reduction in size of hollow shaft 33 and is clamped between said shoulder and the lock nuts 35' so that it remains stationary during the operation of the machine.

Pivoted to the rotatable member 32 below the horizontally disposed flange 31 and above the stationary flange 36 upon studs 37 is a bifurcated lever 38. The bifurcated lever 38 is attached at one end to an eccentric follower 39 and supported upon its other end by means of a bolt 40, pinned or otherwise fixed to the member 40' on the lever 38, is a clamping block 41 and a projecting arm 42 having a slot 43 through which a threaded stud 44 projects. The stud 44 has a handle 45 for turning it to close the clamping block 41 and thereby rigidly and simultaneously clamp the bolt 40 and the projecting arm 42. The outer extremity of the projecting arm 42 is attached to and supports an electrode delivery device 46 having a nozzle 47 through which the welding material 48 is fed to the work. Secured to the device 46 is a hollow flexible guide 49 for directing the welding electrode material 48 from the feeding mechanism in head 15 to the nozzle 47. An extension 49' of the guide tube 49 extends loosely into the opening in the shaft 33. The hollow, flexible guide 49 also preferably contains a conductor or conductors 50 which conduct the welding current to the nozzle 47 from a supply connection indicated at 51. Since the guide tube 49 turns relatively to the shaft 33 by reason of the rotation imparted by the disc 31, a sliding contact should be used to complete the connection 51 between the conductors 50 and some stationary part of the head such as the shaft 33 through which connection may be made to the source of supply for the welding current. While my invention is not limited in such respect the nozzle 47 is preferably curved so that the electrode 48 makes good electrical contact therewith as it is forced therethrough as shown in Fig. 5. This curved nozzle idea of means for leading current into the electrode is claimed in my copending application, Serial No. 502,625, filed September 23, 1921, and assigned to the same assignee as the present application.

For a better understanding of the remaining features of this modification of my invention reference should be had to Figs. 3 and 4 in addition to those already described. The oscillatory or transverse movement imparting means comprises a frame 55 located above the stationary disc 36 and pivoted between arms 56 projecting from the hub member 32 by means of studs 57. The frame 55 like frame 22 is biased downwardly by a spring 58 which causes a friction roller 59 to engage the stationary disc 36. The friction roller 59 is keyed to and slidably mounted upon a shaft 60 one end of which is journaled in the frame 55. Splined to the other end of shaft 60 is an adjustable eccentric member 61 having an axial follower 62 and a radial follower 39 and axially fixed upon the eccentric member 61 is a threaded collar 63 having a knurled portion 64 to facilitate turning the same. The eccentric followers 39 and 62 are held in position by means of a suitable slot 65 in frame 55. The frame 55 also carries a threaded shaft 66 having a forked member 67 threaded thereon and engaging the friction roller 59 thereby providing a means for adjustably locating the friction roller 59 upon the shaft 60. A knurled knob 68 is provided at the end of shaft 66 to facilitate turning the same.

Referring now to Fig. 5 the nozzle 47 is secured to the electrode delivery device 46 by means of a clamping nut 70 and the current conductors 50 are connected to the device 46 by means of a threaded clamping ring 71. The flexible guide 49 as shown in this figure is composed of a flexible metallic tube 72 having insulation 73 surrounding it and the conductors 50 preferably braided thereon, and an additional layer of insulation 74 then put on to cover the conductors 50. This outer layer of insulation 74 can have a flexible metallic protecting sheath if long-wearing qualities are desired.

The operation of this modification is as follows:—

Assuming that it is desired to weld in a line and oscillate the electrode the nozzle 47 is first aligned with the axis of the rotating hub 32 by adjusting the arm 42, the eccentric means 61 being then set to give the proper amplitude to the oscillations and the friction roller 59 being set to give the proper speed of oscillation by varying its distance from the center of the stationary disc 36. The friction roller 24 may be located by means of the forked member 27 and screw shaft 28 in a position which will impart any desired speed to the flange 31 of the rotating hub 32.

The head 15 in this case may be arranged to be capable of traveling along in the direction of the line of the weld, or it may be stationary and the work movable thereunder, to produce straight or curved welds. During the relative movement of the head and the work the shaft 16 will drive shaft 19 by means of the worm 17 and worm wheel 18 and the shaft 19 will drive shaft 23 and friction roller 24 through the medium of the beveled gears 25 and 26. As the friction roller 24 rotates it will cause the flange 31 and hub member 32 to rotate about the hollow vertical shaft 33 and carry with it the various other elements described above as being connected thereto, including the friction roller 59 which engages the stationary disc 36.

As the friction roller 59 is carried around with the hub member 32 it rolls upon the stationary disc 36 and causes the shaft 60 and the adjustable eccentric means to rotate thus imparting an oscillatory movement to the bifurcated member 38 and to the welding nozzle attached thereto by means of the arm 42 and clamping block 41. With the type of adjustable eccentric means here shown it is possible to change the amplitude of the oscillations while the machine is in operation by merely turning knob 64. It is also possible to change the speeds of the various moving elements by merely changing the position of the friction rollers with respect to the center of the surfaces which they engage.

Assuming now that it is desired to weld in a circle, as for instance, around the bottom of a round tank. The adjustments are carried out as suggested above, except that the head 15 in this operation is fixed and the nozzle 47 instead of being centered on the axis of the rotating hub 32, is offset from the center of rotation, a distance equal to the radius of the circle to be welded. As will be seen the welding nozzle 47 will describe a circle as the hub member 32 rotates in response to friction roller 24 and the tip 47 will oscillate as before in response to the oscillation created by the eccentric means 61, and the speed of the same will be controlled by means of friction roller 59. By manipulating the nut 64 to adjust the eccentric means 61, 62 for zero amplitude a plain circular weld may be made without oscillation.

With this modification of my invention it is also possible to weld in a line and obtain a variable circular movement at the welding electrode tip as the line weld is being made. This circular movement has in some cases been found to be more desirable than the transverse oscillatory movement. To obtain this movement it is only necessary to adjust the eccentric 61 to its concentric position and offset the nozzle from its center of rotation a distance equal to half the diameter of the circular movement desired. By adjusting the eccentric the oscillations may be made elliptical in form.

Referring now to the modification shown in Figs. 6 and 7, in this modification of my device I have omitted the means for moving the guide to produce circular welds. The head 15' is similar in construction to the head 15 of Fig. 1 and may be moved over the work or the head may be held stationary and the work moved in any desired manner to produce straight or curved welds.

Projecting from the head 15' is a shaft 80 adapted to be driven in any suitable manner, for example from the electrode feeding mechanism and carried by shaft 80 is a worm gear 81 which meshes with a worm wheel 82 mounted on the upper end of a shaft 83. The shaft 83 is journaled to a bracket 84 secured to the head 15' and it also carries a gear 85 at its lower end. The gear 85 meshes with a larger gear 86 having a smooth flat surface on its lower side which is adapted to engage a friction roller 87. The large gear 86 is mounted upon and rotates freely around a hollow stationary shaft 88 and is held in place by means of lock nuts 89 and a stationary member 90 which is also mounted upon the hollow shaft 88 and held in place by means of a shoulder 91 and nut 92. Set screws 93 are also provided to secure the stationary member 90 in any desired radial position on the shaft 88. The set screws 93 in addition to securing the stationary member 90 in position also pivotally support a bifurcated lever 94. The bifurcated lever supports at one end a clamping block 95 adapted to clamp itself to a bolt 96 which connects the bifurcated ends of the lever 94. The clamping block 95 is also adapted to hold in place a downwardly projecting arm 97 by means of a screw 98 and handle 99. The other end of the bifurcated lever 94 is attached to an eccentric follower 100 which causes the bifurcated lever 94 to oscillate in response to the movements of the eccentric means 101. The lower end of the downwardly projecting arm 97 is secured to and supports the electrode delivery device 102 having a nozzle 103. Connecting the device 102 to the lower end of hollow shaft 88 is a flexible electrode guiding means 104 similar to the guide 49 of Fig. 1. Since in this case the electrode guide tube 104 turns with respect to the shaft 88 only to accommodate adjustment of the member 90 about the shaft, the connection 51' may be supported as indicated at 51'' and lead directly to the source of welding current.

For a better understanding of the other features of this modification reference should also be had to Figs. 8, 9 and 10. The friction wheel 87 is keyed to and slidably mounted upon a shaft 105 journaled in a yoke 106 projecting from the stationary member 90 and it is held in any desired position with respect to the center of rotation of gear 86 by means of a forked member 107 slidably mounted in the yoke 106, and a screw shaft 108 with which it engages. A knurled knob 109 is provided at the end of the screw shaft 108 to facilitate adjustment of the same. Mounted upon the outer end of shaft 105 is the eccentric means comprising the eccentric member 101 and the eccentric follower 100. A threaded disc 110 is also provided for locating the eccentric means 100 and 101 upon the shaft 105 and a winged nut 111 is provided to clamp the eccentric means 101 in any position of eccentricity.

The operation of this modification of my device is as follows:

Assuming that the machine has been adjusted for height and direction of weld, the machine is set in motion and as the electrode material is fed through the nozzle 103 the shaft 80 will rotate and through the medium of worm 81, worm wheel 82, shaft 83 and gear 85 cause the large gear 86 to rotate. As the large gear 86 rotates the friction roller 87 will also rotate and cause the eccentric means 101 to impart an oscillatory movement to the bifurcated lever 94 to which it is connected and through the arm 97 cause the nozzle 102 also to oscillate.

In this modification the amplitude of the oscillation of the welding nozzle can be changed at any time by changing the setting of the eccentric means and the speed of oscillation can be adjusted at any time by varying the location of the friction roller 87 with respect to the disc from which it is driven.

A further novel feature of my invention lies in the manner and ease of adjusting the welding nozzle with respect to the work. When it is desired to move the nozzle, all that is required is to loosen the handle 45 of Fig. 1 or 99 of Fig. 6 which clamps the downwardly projecting arm to the bifurcated lever. The nozzle can then be moved up or down within the limits of the slot in the downwardly projecting arm and sidewise to practically the same extent without disturbing the other elements of the machine.

While I have described my invention particularly as applied to electric arc welding with a metallic electrode, it will be obvious to those skilled in the art that my invention is not limited in its broader aspects to such welding, but that many features thereof are capable of general application in the welding machine art.

I do not claim broadly the idea of means comprising a flexible guide tube for guiding an electrode from electrode feeding mechanism to the point where welding is to be done since this is claimed in the copending application of Paul O. Noble, Serial No. 487,875, filed July 27, 1921, and assigned to the assignee of the present application.

What I claim as new and desire to secure by Letters Patent of the United States, is,—

1. In a welding machine of the class described wherein a welding arc is maintained between a metallic electrode and the work and wherein feeding means is provided for continuously feeding the electrode to the arc, the combination of a support, a flexible guide for guiding said electrode from the feeding means to the arc, a movable arm projecting from said support adapted to support the discharge end of said flexible guide, and means for imparting oscillatory movements to said movable arm and the discharge end of said flexible guide.

2. In a welding apparatus of the class described; wherein a welding arc is maintained between an electrode and the work, the combination of a flexible guide for said electrode, a nozzle at the discharge end of said flexible guide, an arm having its end adapted to support said nozzle, a support for said arm and clamping means between said arm and its support for securing said nozzle in a plurality of horizontal and vertical positions with respect to said support.

3. In a welding apparatus of the class described, the combination of a feeding means adapted to feed a welding wire to the work, a flexible guide for said wire, an arm for supporting the discharge end of said flexible guide, and means comprising a pivoted lever and an adjustable eccentric for imparting variable oscillatory movements to said arm and the discharge end of said flexible guide.

4. In an automatic arc welding machine wherein a welding head and the work are arranged to be moved relatively, means for feeding an electrode from said head to the welding arc, an arm carried by said head, means for oscillating said arm, a nozzle carried by said arm, and a flexible guiding means for guiding the electrode from said feeding means to said nozzle.

5. In an electric arc welding machine, the combination of a means for feeding electrode material to a welding arc, a flexible guide for guiding the electrode material from said feeding means to said welding arc, a support for the discharge end of said flexible guide, a universal clamping means for clamping said support in any desired position, and means for imparting oscillatory movements to the discharge end of said electrode guiding means and to said support.

6. An automatic arc welding machine having means for feeding an electrode to the welding arc, and means for oscillating said electrode at the welding arc, characterized by the fact that means are provided whereby the speed, amplitude and direction of the oscillation are independently adjustable.

7. In welding apparatus, a welding electrode, an adjustable welding electrode supporting means, a universal clamping means for clamping said electrode supporting means in a plurality of positions, and eccentric means connected to said universal clamping means for imparting oscillatory movements to the welding electrode.

8. In an automatic metallic electrode welding machine, the combination of a rotatable member, an adjustable speed driving means for said rotatable member, a lever pivoted to said rotatable member, eccentric means for oscillating said lever about its pivot adjustable for various amplitudes of oscillation, an arm supported by said lever, an electrode nozzle at the end of said arm, and a flexible guide for guiding the electrode to said electrode nozzle.

9. In an automatic metallic electrode welding machine, the combination of a support, an electrode feeding means mounted thereon, a rotatable member mounted on said support, an adjustable speed driving means for said rotatable member, a lever pivoted to said rotatable member, an arm supported by said pivoted lever and arranged to control the motion of the welding tip of the electrode, eccentric means supported from said rotatable member arranged to oscillate said pivoted lever, and a variable speed means for driving said eccentric means.

10. In a automatic arc welding machine, the combination of electrode feeding means, a nozzle for directing the electrode to the work, a flexible guide for guiding the electrode from said feeding means to said nozzle, and an adjustable eccentric means for imparting oscillatory movements of any desired amplitude to said nozzle.

11. In automatic metallic electrode welding apparatus, an adjustable eccentric means for oscillating the welding tip of the electrode comprising a shaft having a diagonally disposed portion thereon, a follower mounted upon said diagonally disposed portion, a second follower mounted upon said first mentioned follower, a means for aligning said followers, and means for axially moving said diagonally disposed portion with respect to said followers.

12. In a welding machine of the class described, the combination of a support, an electrode feeding mechanism on said support, a flexible tube for guiding the electrode from said feeding mechanism to the work, an arm rotatably mounted upon said support for supporting the discharge end of said flexible tube, and means associated with said electrode feeding means for oscillating said arm as the electrode is fed through said flexible tube to the work.

13. In an electric arc welding machine, the combination of a supporting head, electrode feeding means adapted to feed an electrode continuously to the work, a flexible guide for directing said electrode to the work, a movable arm adapted to engage the discharge end of said flexible guide, and a clamping means for securing said movable arm in a plurality of positions of longitudinal and lateral adjustment.

14. An electric arc welding machine of the type wherein electrode feeding means are provided for feeding an electrode to the arc, the combination of a flexible guide tube for guiding the electrode from the feeding means to the work, characterized by the fact that means are provided for moving the discharge end of said guide tube in a circular path, and by the fact that means are provided for imparting oscillating movements of adjustable speed and amplitude to the discharge end of said tube simultaneously with movement in said circular path.

15. In a welding machine wherein a metallic rod is progresively fused and the fused metal incorporated in the weld and wherein a flexible tube is arranged to guide the rod to the work and wherein means are provided for feeding the rod through said tube, characterized by the fact that means are provided adapted to impart a circular motion to the discharge end of said tube, and by the fact that means are provided adapted simultaneously to impart an oscillating motion to said end of said tube, and by the fact that means are provided for varying the amplitude of said circular and oscillating motions.

16. A welding machine of the type wherein a metallic rod is progressively fused and the fused metal incorporated in the weld comprising in combination a flexible tube arranged to guide the rod to the point of welding, means for feeding the rod through said tube, means for imparting a circular motion to the discharge end of said tube, adjusting means whereby the diameter of the circular motion may be adjusted, means adapted to impart an oscillating motion to the end of said tube, and means for adjusting the amplitude of the oscillating movement.

In witness whereof, I have hereunto set my hand this 9th day of November, 1922.

CHARLES E. GLASSER.